US012154047B1

(12) United States Patent
Govindan et al.

(10) Patent No.: US 12,154,047 B1
(45) Date of Patent: Nov. 26, 2024

(54) SYSTEM FOR ELECTRONIC SERVICE INTEROPERABILITY

(71) Applicant: Wells Fargo Bank, N.A., San Francisco, CA (US)

(72) Inventors: Rajeswaran Govindan, Livermore, CA (US); Margaret Seter Honeycutt, Crockett, CA (US); Wyman Yu, San Francisco, CA (US); Jason V. Biala, Martinez, CA (US); Ryan Lee Hammond, San Jose, CA (US); Dennis E. Montenegro, Concord, CA (US); Christopher Sipanya, San Jose, CA (US); Sergey Yamandiy, Castro Valley, CA (US); Miriam Felecia Clark, San Francisco, CA (US); Jason Huang, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 46 days.

(21) Appl. No.: 17/807,651

(22) Filed: Jun. 17, 2022

(51) Int. Cl.
| | |
|---|---|
| *G06Q 10/0631* | (2023.01) |
| *G06Q 30/0601* | (2023.01) |
| *H04L 67/306* | (2022.01) |

(52) U.S. Cl.
CPC . *G06Q 10/06311* (2013.01); *G06Q 10/06316* (2013.01); *G06Q 30/0601* (2013.01); *H04L 67/306* (2013.01)

(58) Field of Classification Search
CPC ....... G06Q 10/06311; G06Q 10/06316; G06Q 30/0601; H04L 67/306

(Continued)

(56) References Cited

U.S. PATENT DOCUMENTS

| 9,911,149 B2 | 3/2018 | Allen et al. | |
|---|---|---|---|
| 2011/0098928 A1* | 4/2011 | Hoffman | G06F 1/163 |
| | | | 702/5 |

(Continued)

FOREIGN PATENT DOCUMENTS

WO  WO-2015089042 A1  6/2015

OTHER PUBLICATIONS

Managing money can be a snap—or click Websites offer a fun way to keep track of spending, saving and investments, set financial goals and get good rates. Cruz, Humberto. St. Louis Post—Dispatch [St. Louis, Mo] Jul. 26, 2009: D.2.*

(Continued)

*Primary Examiner* — Timothy Padot
(74) *Attorney, Agent, or Firm* — SCHWEGMAN LUNDBERG & WOESSNER, P.A.

(57) ABSTRACT

A method may include receiving, at a server device, a request from a third-party website over an application programming interface (API), the request including a user identification and an item identification; retrieving, at the server device, a set of goal data structures generated for a user profile of a user matching the user identification; matching, at the server device, the item identification to an identification within a goal data structure of the set of goal data structures, the goal data structure including a plurality of steps associated with the goal data structure; generating, at the server device, a response data structure including a status of each step of the plurality of steps associated with the goal data structure; and transmitting the response data structure to the third-party website.

20 Claims, 5 Drawing Sheets (58) Field of Classification Search
USPC .................................................. 705/7.13
See application file for complete search history.

(56) References Cited

U.S. PATENT DOCUMENTS

| | | |
|---|---|---|
| 2011/0231224 A1 | 9/2011 | Winters |
| 2012/0166268 A1 | 6/2012 | Griffiths |
| 2012/0254804 A1* | 10/2012 | Sheha .................. G06F 3/0488 |
| | | 715/834 |
| 2013/0346234 A1* | 12/2013 | Hendrick ........... G06Q 30/0601 |
| | | 705/26.7 |
| 2014/0040248 A1* | 2/2014 | Walsham ............ G06F 16/9535 |
| | | 707/723 |
| 2014/0157171 A1* | 6/2014 | Brust .................... G06F 3/0481 |
| | | 715/771 |
| 2014/0330624 A1 | 11/2014 | Mosites et al. |
| 2016/0117726 A1 | 4/2016 | Lee |
| 2016/0239867 A1 | 8/2016 | Sinha et al. |
| 2017/0193591 A1* | 7/2017 | Narasimhan ....... G06Q 30/0641 |
| 2017/0300968 A1* | 10/2017 | Reiver ............... G06Q 30/0272 |
| 2020/0219157 A1 | 7/2020 | Mossoba et al. |
| 2020/0302811 A1* | 9/2020 | Beaty ..................... G06F 17/11 |
| 2020/0349648 A1* | 11/2020 | Cosmano ............... G06Q 40/06 |
| 2021/0049634 A1 | 2/2021 | Ericson |
| 2023/0114736 A1* | 4/2023 | Hakimi .................. G06N 5/022 |
| | | 706/12 |

OTHER PUBLICATIONS

EMoney Advisor Launches Redesigned Client Website with New User Experience and Goal-Planning Functionality:—The redesign enables a more engaging client experience, allowing clients to see, track and analyze progress towards their financial goals PR Newswire [New York] Sep. 7, 2017.*

The Price Wizards, LLC: An online price comparison website that compares products and merchants through one website: www.thepricewizards.com. M2 Presswire [Coventry] Oct. 20, 2016: discloses an online price comparison website for comparing products and merchants though one website.*

Krishnamoorthy Srikumar; Bhasker, Bharat. Applications of recommender systems in target selection. Journal of Targeting, Measurement and Analysis for Marketing 13.1 (Oct. 2004): 61-69.*

Cho, Chang-Hoan, et al., "Online Shopping Hesitation", Cyberpsychol Behav 9;(3) 261-97, (Jun. 2006).

* cited by examiner

SYSTEM FOR ELECTRONIC SERVICE INTEROPERABILITY

BACKGROUND

Websites and applications have enabled users to automate or facilitate many tasks that were traditionally done manually by user. For example, one website may allow a user to keep track of their goals. Another website may be used to manage a user's calendar. Yet another website may be used to help manage the user's finances. These websites are services are often siloed off from each other and do not readily communicate with each other.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., RAM, cache, hard drive) accessible by the component via an API or other program communication method. Similarly, the variables may be assumed to have default values should a specific value not be described. User interfaces may be provided for an end-user or administrator to edit the variable values in some instances.

In various examples described herein, user interfaces are described as being presented to a computing device. Presentation may include transmitting data (e.g., a hypertext markup language file) from a first device (such as a web server) to the computing device for rendering on a display device of the computing device via a rendering engine such as a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements. Although in some examples these portions may be displayed on a screen at the same time, in other examples the portions/elements may be displayed on separate screens such that not all of the portions/elements are displayed simultaneously. Unless indicated as such, the use of "presenting a user interface" does not infer either one of these options.

Additionally, the elements and portions are sometimes described as being configured for a certain purpose. For example, an input element may be described as being configured to receive an input string. In this context, "configured to" may mean presentation of a user interface element that is capable of receiving user input. Thus, the input element may be an empty text box or a drop-down menu, among others. "Configured to" may additionally mean computer executable code processes interactions with the element/portion based on an event handler. Thus, a "search" button element may be configured to pass text received in the input element to a search routine that formats and executes a structured query language (SQL) query with respect to a database.

Computer tools for managing a user's goals are often separate from websites a user may visit. A goal may be to save for a purchase, plan a vacation, save for college, or save for retirement, among others. For purchases in particular a user may use the shopping cart or "save for later" lists of a website as a way to keep track of items they may want to purchase. Separately, the user may use an online goal tracking service to manage their goals.

There are multiple problems with approach above. First, when researching an item for potential purchase, the user may go to multiple websites and add the item to each website's cart, but have no way of knowing the current price at each. Secondly, a merchant's goal is to get you to purchase the item as quickly as possible-even if the user is still in the research or planning stage. Third, there is no data connection between the goal tracking service and the merchant websites.

Discussed herein are improvements to merchant websites and goal tracking services that better align with a user's needs. These improvements provide new data connection abilities previously unavailable to the websites or services, as well as improved user interfaces. For example, a website may request, from the goal tracking service, data related to the goal. The received data may be embedded within the merchant website such that it is available to the user in a user interface when viewing a shopping cart of the merchant.

Additionally, the goal tracking service may be improved by electronically limiting—with a user's consent—the ability to impulse purchase an item by requiring certain touch points (e.g., steps) before the "buy" button is active. For example, as part of a goal a user may research the item, wait a certain amount of days since adding it to a shopping cart, request approval from a group of selected friends, etc. These steps may be automatically tracked and completed using signals from devices associated with the user, in various examples. A signal may be transmitted from the goal tracking service to a merchant when the steps are complete in order to activate a purchase button.

Figure 1:
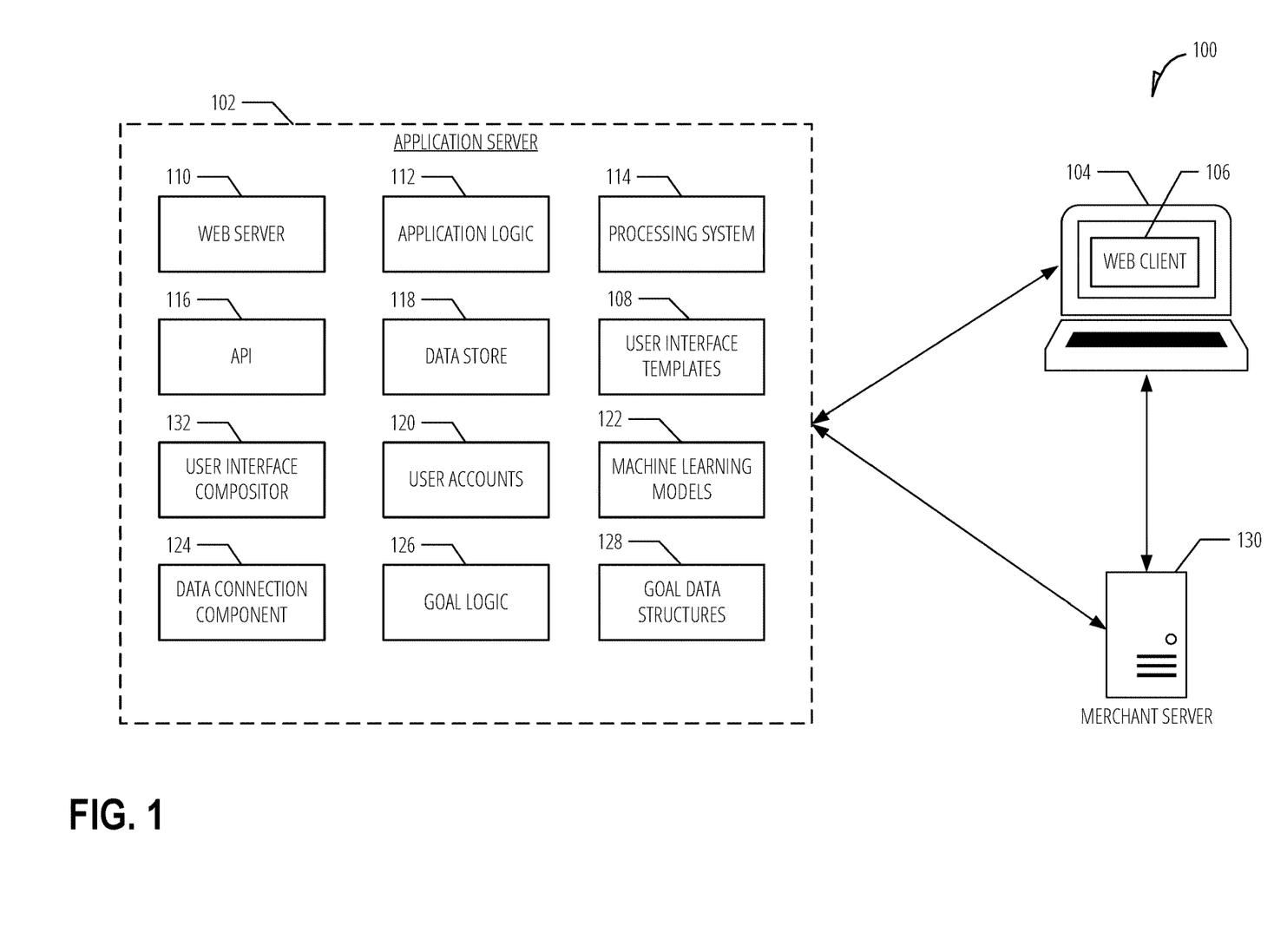
FIG. 1 is an illustration of components of a client device and an application server, according to various examples.

FIG. 1 is an illustration of components of a client device and an application server, according to various examples. FIG. 1 includes application server 102 and client device 104. Client device 104 is illustrated as including web client 106.

Application server 102 is illustrated as including user interface templates 108, web server 110, application logic 112, processing system 114, application programming interface (API) 116, data store 118, user accounts, 120, machine learning models 122, data collection component 124, goal logic 126, and goal data structures 128, merchant server 130, and user interface compositor 132.

Application server 102 is illustrated as set of separate elements (e.g., component, logic, etc.). However, the functionality of multiple, individual elements may be performed by a single element. An element may represent computer program code that is executable by processing system 114. The program code may be stored on a storage device (e.g., data store 118) and loaded into a memory of the processing system 114 for execution. Portions of the program code may be executed in a parallel across multiple processing units (e.g., a core of a general purpose computer processor, a graphical processing unit, an application specific integrated circuit, etc.) of processing system 114. Execution of the code may be performed on a single device or distributed across multiple devices. In some examples, the program code may be executed on a cloud platform (e.g., MICROSOFT AZURE® and AMAZON EC2®) using shared computing infrastructure.

Client device 104 may be a computing device which may be, but is not limited to, a smartphone, tablet, laptop, multi-processor system, microprocessor-based or programmable consumer electronics, game console, set-top box, or other device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device.

Client device 104, application server 102, and merchant server 130 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet.

In some examples, the communication may occur using an application programming interface (API) such as API 116. An API provides a method for computing processes to exchange data. A web-based API (e.g., API 116) may permit communications between two or more computing devices such as a client and a server. The API may define a set of HTTP calls according to Representational State Transfer (RESTful) practices. For examples, A RESTful API may define various GET, PUT, POST, DELETE methods to create, replace, update, and delete data stored in a database (e.g., data store 118).

For example, an API call may be made from merchant server 130 to application server 102 to inquire if an item in the shopping cart of a user matches a goal of the user. Or an API call may be made that indicates a step of a goal has been completed. Furthermore, although the APIs are discussed as being part of application server 102, merchant server 130 may have their own APIs as well.

APIs may also be defined in frameworks provided by an operating system (OS) to access data in an application that an application may not regularly be permitted to access. For example, the OS may define an API call to obtain the current location of a mobile device the OS is installed on or navigation information of a vehicle. In another example, an application provider may use an API call to request a be authenticated using a biometric sensor on the mobile device. By segregating any underlying biometric data—e.g., by using a secure element—the risk of unauthorized transmission of the biometric data may be lowered.

Application server 102 may include web server 110 to enable data exchanges with client device 104 via web client 106 as well as communicate with merchant server 130. Although generally discussed in the context of delivering webpages via the Hypertext Transfer Protocol (HTTP), other network protocols may be utilized by web server 110 (e.g., File Transfer Protocol, Telnet, Secure Shell, etc.). A user may enter in a uniform resource identifier (URI) into web client 106 (e.g., the INTERNET EXPLORER® web browser by Microsoft Corporation or SAFARI® web browser by Apple Inc.) that corresponds to the logical location (e.g., an Internet Protocol address) of web server 110. In response, web server 110 may transmit a web page that is rendered on a display device of a client device (e.g., a mobile phone, desktop computer, etc.). Web server 110 may also respond to merchant server 130 with information regarding a goal of a user, as discussed in more detail herein.

Additionally, web server 110 may enable a user to interact with one or more web applications provided in a transmitted web page. A web application may provide user interface (UI) components that are rendered on a display device of client device 104. The user may interact (e.g., select, move, enter text into) with the UI components, and, based on the interaction, the web application may update one or more portions of the web page. A web application may be executed in whole, or in part, locally on client device 104. The web application may populate the UI components with data from external sources or internal sources (e.g., data store 118) in various examples.

In various examples, the web application is the goal tracking user interface. The goal tracking user interface may display goals that have been created by the user and their current status. For example, each goal may be represented as a card on the user interface with a title, a type of the goal, and visual indications of the steps that are needed to complete the goal. Thus, a purchase style goal may include an item picture, an item price, and a link to the merchant shopping cart for which the item is currently in. If the item is currently in multiple shopping carts across multiple merchants, multiple prices that reflect the most current price of the merchant for the item may be presented.

The goal tracking user interface may be customizable by the user. For example, a user may group the goals into categories and filter according to the goals categories using a dropdown menu or other user interface element. Similarly, filters may be used according to a type of the goal, or an end date (e.g., when the user wishes to have completed the goal). A more detailed explanation of the user interface is discussed with respect to goal logic 126 and goal data structures 128.

The web application may be executed according to application logic 112. Application logic 112 may use the various elements of application server 102 to implement the web application. For example, application logic 112 may issue API calls to retrieve or store data from data store 118 and transmit it for display on client device 104. Similarly, data entered by a user into a UI component may be transmitted using API 116 back to the web server. Application logic 112 may use other elements (e.g., data collection component 124, goal logic 126, goal data structures 128 etc.) of application server 102 to perform functionality associated with the web application as described further herein.

Data store 118 may store data that is used by application server 102. Data store 118 is depicted as singular element, but may in actuality be multiple data stores. The specific storage layout and model used in by data store 118 may take a number of forms-indeed, a data store 118 may utilize multiple models. Data store 118 may be, but is not limited to, a relational database (e.g., SQL), non-relational database (NoSQL) a flat file database, object model, document details model, graph database, shared ledger (e.g., blockchain), or a file system hierarchy. Data store 118 may store data on one or more storage devices (e.g., a hard disk, random access memory (RAM), etc.). The storage devices may be in standalone arrays, part of one or more servers, and may be in one or more geographic areas.

User accounts 120 may include user profiles on users of application server 102. A user profile may include credential information such as a username and hash of a password. A user may enter in their username and plaintext password to a login page of application server 102 to view their user profile information or goal interfaces presented by application server 102 in various examples.

A user profile may also include authorization to access other services in which the user has an account. The authorizations may include a token (e.g., using OAuth) or login credentials that authorize application server 102 to retrieve data from the other services in a defined format such as JavaScript Object Notation (JSON) or extensible markup language (XML) over an API. A reciprocal authorization may also be stored in the user profile that authorizes the other services to access data stored in the user profile. For example, a user profile may include an authorization token with merchant server 130 that permits application server 102 to respond to requests from merchant server 130 for information associated with the user's account. Another authorization may be with a financial institution of the user such that application server 102 may access current account balances and the transaction history of the user.

A user account may also identify computing devices associated with the user. For example, a user may register one or more phones, desktop computers, tablets, laptops, or vehicles with application server 102. Registering may include authorizing application server 102 to retrieve data such as location data, speed data, mode data (e.g., do not disturb, etc.) browser history, etc., from these devices. A user may revoke access to any such data at any time by updating their user profile. The data may be gathered via an application installed on one of the registered devices such as by downloading an application from an app store associated with the platform of their mobile phone.

A user account may also identify a list of contacts for authorizing purchases as one of the steps to complete a goal. The contacts may include a preferred device of the contact for transmitting push notifications to with respect to an authorization request. Each the contacts may have a weight to allow for a vote (e.g., yes or no on a purchase) of one contact to have a higher impact than another contact. The weights may be adjusted by the user using an input box user element.

A user account may also store preferences of the user with respect to goal completion. For example, one of the steps for purchase may be a waiting period with respect to how long a user should wait after adding an item to a shopping cart before purchase. The user may include a default value (e.g., two days) for the waiting period. Another preference may indicate how many contacts of the list of contacts to send for voting on whether a purchase should proceed or not. The preferences may further delineate which subset of the context to use for the votes. Another preference may be how many steps should be completed before purchase is allowed. Thus, consider there are six steps for a purchase. The user may indicate that at least four should be completed before the purchase button on a merchant site is unlocked.

In various examples, user interface templates 108 are used to generate a visualization of a user's goals. Different user interface templates may be used depending on the presentation device and the client. For example, one template may be used for when the user is viewing multiple goals, and another template may be used when the goal is being presented as embedded in part of a shopping cart interface of a merchant.

A template may be a structured data file that adheres to a schema for elements (e.g., media, text, graphics, etc.) in the file. For example, an extensible markup language (XML) schema may define a hierarchy of elements that each template may have, including but not limited to: path data (e.g., /res/images) to raster images (JPEG, PNG, etc.) or vector files (e.g., scalable vector graphics) with absolute or relative placement location coordinates for each, potential locations for event data, Bezier path data, variant information based on screen size (e.g., pixel resolution) or device type (e.g., desktop vs mobile phone), etc. A translation file such as an Extensible Stylesheet Language Transformations (XSLT), may be used to convert the elements of the template to a webpage format such as hypertext markup language (HTML) file for use by web server 110.

As an example, a template may define what type of shapes to use to represent each step of a goal, the locations of the shapes with respect to a presented bounding box, element locations for text related to the goal, and animations or static images that represent the overall progress of the goal. Examples of the user interfaces are discussed in more detail with respect to FIG. 2 and FIG. 3.

User interface compositor 132 may be used to gather data stored by application server 102 to present in the locations identified by a user interface template. For example, a user interface template may be retrieved from data store 118 that is for a card view of a goal. The template may use data related to a goal title, a goal price, an image, and status information with respect to six steps of the goal. User interface compositor 132 may query data store 118 for the needed information as identified by the template for a first goal. In various examples, each element of the template may be matched to an element of a goal data structure file as discussed further below. The user interface compositor 132 may then serve the completed file (e.g., an XHTML file) via web server 110 to client device 104.

Machine learning models 122 may store and train machine learning models for use by components of application server 102. For example, a sentiment machine learning model may be used to analyze (using natural language processing to count a ratio of positive words to negative words) electronic communication (e.g., social media posts) of the user to classify an inferred current mood of the user.

Another machine learning model may be used to output a confidence level that a user has researched an item and thus completed a research step. The research machine learning model may be a supervised learning algorithm (e.g., neural network, k-nearest neighbor) that is trained using categorizations (e.g., using a natural language processor) of the past day's browser history data of users of application server 102 with respect to when the user marked an item as researched.

For example, consider a user researching a car for purchase and the application server 102 receives an explicit signal (e.g., the user has clicked) that the research is complete. The categorized past days browser history may be used as the training input to the machine learning model.

Accordingly, application server 102 may periodically run a second user's past days browsing history into the machine learning model to determine the likelihood the second user has conducted research on a vehicle goal. If the confidence output of the machine learning model is above a certain threshold, a notification may be transmitted to the second user to request confirmation that the research has been completed. If the second user indicates that the research has not been completed, the machine learning model may be updated (e.g., using backpropagation if the model is a neural network) to increase the models accuracy.

Additional machine learning models may be used to determine if a user has completed a "test drive" of an item using location data of a computing device of the user as input.

Goal logic 126 may be used to general a goal data structure file, set the steps required for the goal to be complete, the way each step may be completed. A step may be, but is not limited to, research of an item, comparison to other options, obtaining input from contacts, obtaining input from experts, testing an item, a delay period, and completing a questionnaire to assess need for the item.

A goal may be generated in a variety of manners. For example, a user interface served by application server 102 may present user interface elements for inputting a new goal by the user. The elements may include a type of the item, a picture of the item, which may be uploaded, an end date for the goal, etc. In other examples, a goal may be automatically created by receiving a request from a merchant site when a user adds an item to the shopping cart of the merchant. In these instances, an item identifier may be generated to uniquely identify the item to both the merchant and application server 102.

A goal data structure may then be generated by goal logic 126 using the user input and stored as part of goal data structures 128 in data store 118. A goal data structure may be a standardized data structure (e.g., XML) according to a defined schema such as an XML schema. For example, an element of a goal data structure schema may be a title, an image location path (e.g., "/resources/goalpicture.png"), a start date, an end date, a merchant item identification, a merchant URL, a step for completion, completion status of a goal, or a goal amount.

A goal may also be generated automatically by goal logic 126 based on an input signal from a merchant website. For example, consider that a user is browsing for items on merchant server 130 and adds an item to the sites shopping cart. Application server 102 may be notified (e.g., the input signal) of the addition in a number of manners. For example, an authorization may be present as part of the user's profile in user accounts 120 that allows communication via API that the user has added the item. The user may also have a plugin provided by application server 102 that monitors browser activity of the user and detects the addition.

When the input signal is received, goal logic 126 may generate a new goal data structure based on the information received with the input or requested by application server 102 and present it to the user for confirmation. For example, the image for the item may be used as part of the goal data structure, the price may be retrieved via a request to merchant server 130, etc.

In various examples, goal logic 126 may make an initial determination of whether the goal should be created based on past behavior of the user. For example, if the goal is for a new bike, but the user has already purchased ten bikes in the past two years, a message may be transmitted to the user asking if the user still wants to proceed.

Some of the steps required to complete a goal may be determined automatically by goal logic 126. A user may add or remove steps determined by goal logic 126. In another example, the user may define what steps and default values of the steps may be stored as part of their preferences in their user profile.

With respect to automatically adding steps for the purchase of an item, the steps may automatically include a waiting period. The length of the waiting period may be determined according to the price of the item (e.g., more expensive items have a longer default). In another example, anonymized data of other users in application server 102 may be analyzed by goal logic 126 to determine how long other users usually wait after adding an item of similar type before purchase and this length may be used for the step.

Goal logic 126 may also define how a step of the goal may be completed. A step may be completed in a number of manners. For example, a step is completed when a user indicates (e.g., clicks a user interface element) indicating that a step has been completed. Some steps may be completed without user involvement such as counting down the waiting period.

Goal logic 126 may facilitate completion of steps as well. For example, goal logic 126 may periodically (e.g., daily) check for uncompleted steps of a user's goals. A notification may be presented to the user with a list of some or all of the uncompleted steps and provide opportunities to complete a step. For example, if a step is to obtain input from friends of the user, a user interface element may be presented that may transmit notifications to a subset of the user's friends with voting options (e.g., purchase or not purchase) an item. If the user accepts (e.g., clicks the element), goal logic 126 may mark the step as completed.

Goal logic 126 may use the location of a user (e.g., inferred based on computing device locations) to present notifications as well. For example, if a goal is for a car and the location indicates the user is within a mile radius of a car dealership, goal logic 126 may push a notification to the user to take a test drive and complete a "test an item" step.

Goal logic 126 may also infer completion of a step using of one or more machine learning models 122. For example, user data collected by application server 102 (e.g., browser data, location) may periodically be inputted into the machine learning models 122 with respect to an item. If the output of a machine learning model indicates the step was likely completed (e.g., above a certain threshold probability), a notification may be sent to the user to confirm the step was completed.

For research or comparison steps, goal logic 126 may provide links to educational materials or questionnaires. For example, if a goal is to purchase a house, goal logic 126 may provide a link to a housing questionnaire or informational document about home ownership.

Goal logic 126 may also retrieve (e.g., using API request, screen scraping, etc.) additional information to a user regarding a goal for completing a step. For example, if the same item has been added to multiple shopping carts across different merchant website, goal logic 126 may present the current best price across the various websites. Goal logic 126 may also send a request to a price comparison service to determine if the item may be purchased for less than any of the current shopping carts the user has the item in. Goal logic 126 may present information about each of the merchants such as the total amount the user has spent at a merchant, the last date of purchase, how the purchase would affect a user's budget, how different payment methods may impact long term goals, etc.

In some instance, goal logic 126 may suggest testing a different item than the item identified by the user. For example, if the item is particular television 55" model, goal logic 126 may suggest viewing a 65" model that is in stock at a local retailer. Another possible step for a goal may be to compare the item in the goal to a different item such as a television by a different manufacturer.

When the step is for obtaining feedback from one or more users, goal logic 126 may select the users and weight their responses. For example, goal logic 126 may use the five most frequently contacts users (based on mobile device calling logs, social media chat sessions). If one contact is indicated as the spouse or significant other of the user (as stored in the user profile) the response from that contact may be given more weight. If over 50% (or other threshold) of the weighted average of the responses indicates approval, the step may be considered complete.

In addition to determining whether a particular step of a goal is completed, goal logic 126 may calculate an overall status of the steps. Not all of the steps need to be completed before goal logic 126 may indicate an item may be purchased. Different steps may have different weights and the overall status may be considered complete if the weighted steps add up to a certain value. A step may have a partial completion value as well. As an example, the step of waiting until the end of the waiting period may be given three times the weight of obtaining approval from a contact of the user.

An example formula may be $$\text{status} = \sum_{i=1}^{n} s_i w_i$$

where n is the number of steps for the goal, sis the completion value of step i, and w is the weight for step i. The weights of each step may have a default value but may be modified by a user or vary between types of goals or cost of items. When the overall status is above a certain value, the goal may be considered complete regardless of the status of any individual component, in various examples. In various examples, the status of a step is standardized such as that the maximum value is one and the weights may be set such that the total weight is also one. Accordingly, the overall status may be between zero and one.

User interface compositor 132 may present the overall status of a goal to a user in a number of ways. Different icons may be used based on the status value such as using a sad face icon for a zero value, a straight face icon for values between 0.25 and 0.75, and a happy face icon when the value is above 0.75 (assuming this value indicates the goal is complete). Other visualizations may include filling up a rectangle or other shape, such as a thermostat, based on the status value or using color as a status identifier (e.g., red, yellow, green) of an outline of the goal, title of the goal, etc.

Application logic 112 may operate in a number of modalities to customize how a user interacts with goals. A base modality may be a passive, tracking modality in which a user is not prevented from purchasing an item from a merchant's shopping cart. In this mode, a user may view their goals and the completed steps, but otherwise the decision to make a purchase is up to them. In a purchase restriction mode, application logic 112 may interface with merchant server 130 to prevent a user from purchasing an item until the overall status of the goal is above the "completed" threshold for the goal. Preventing may include graying out the purchase button in a shopping cart, and if a user selects purchase a notification may appear that the user should complete more of the goal's steps before proceeding.

In order to not completely disable the purchase ability, the purchase restriction mode may be configured to allow the purchase in certain instances. For example, a user may toggle (via a user interface element of the goal by user interface compositor 132) whether or not the restriction mode should be used for a goal. Global settings may also be used to indicate times of day when the restriction mode should be used, a cost of an item over/under which the mode should be enabled, when a user is driving, when the user is in certain locations (e.g., a bar) as determined by location data of computing devices of the user, if the user is over a budget (as determined by the user profile), etc.

Notwithstanding the global settings, the restriction mode may also include an "impulse" purchase button that may be activated in order to allow the user to proceed. The button may be presented in the shopping cart in some examples. A user may be able earn impulse purchase buttons for practicing good financial health such as adding money to a retirement account or regularly contributing to a savings goal.

Figure 2:
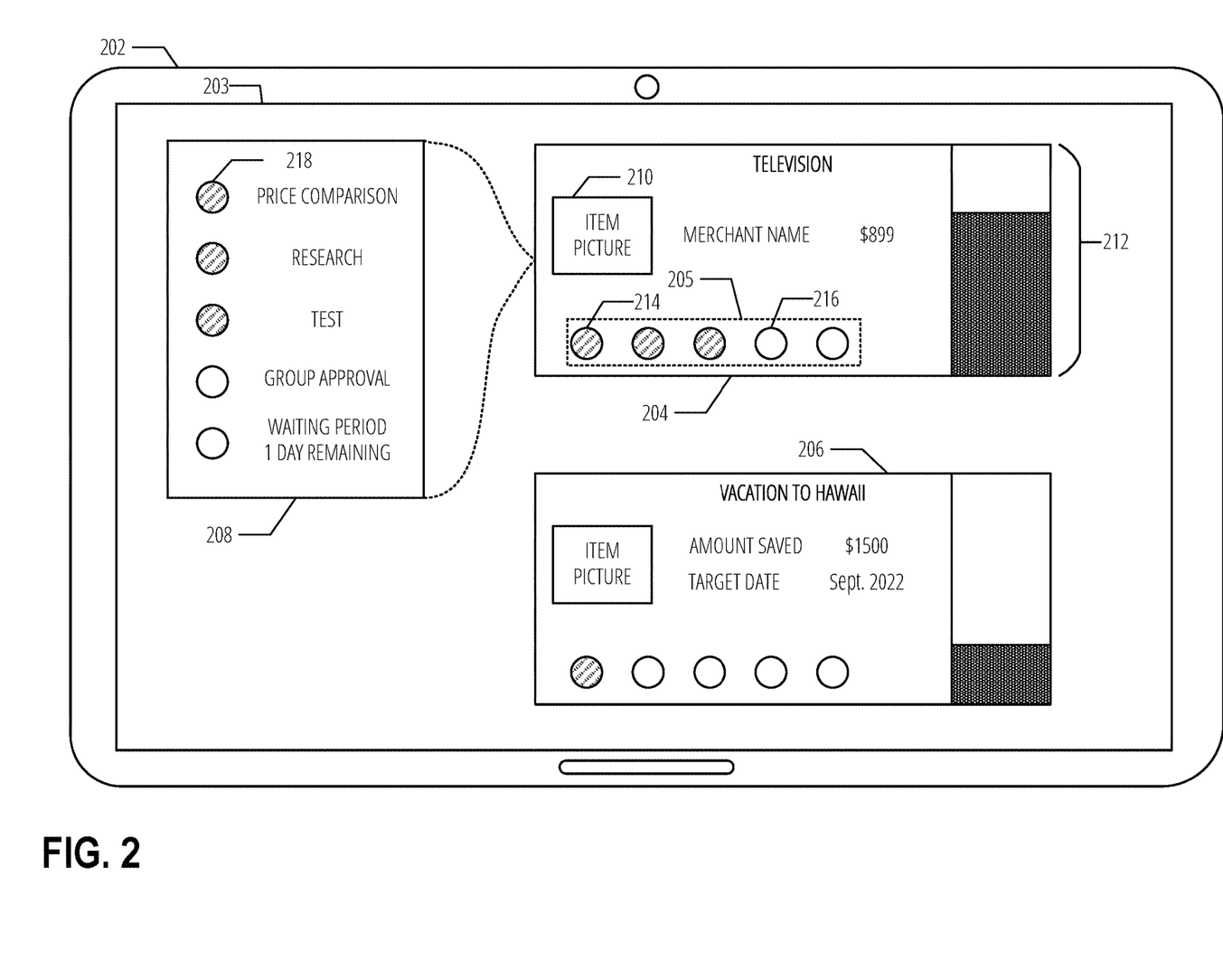
FIG. 2 is an illustration of a card view user interface, according to various examples.

FIG. 2 is an illustration of a card view user interface 203 on a computing device 202, according to various examples. The computing device may be a device such as described with respect to client device 104. The interface presented may be in response to a user logging into application server 102 using their credentials from their user account. The interface may be an overview interface that presents one or more of the user's goals in a "card." The shape and arrangement of the goals in FIG. 2 are just one example, and other arrangements may be used as well such as, but not limited to, a table format, Kanban format, etc.

The presented card view user interface 203 includes two goals, goal 204 for purchasing a television and goal 206 for saving for a trip to Hawaii. A goal may be presented with one or more components related to elements of the goal. For example, goal 204 includes a title of "Television", an item picture 210, overall goal status 212, individual step statuses 205, step status indicator 214, step status indicator 216, a merchant name, and a price. The elements presented may be an interface generated by user interface compositor 132 based on a goal data structure stored in data store 118. In various examples, the merchant name may be configured as a link to the shopping cart of the merchant.

As illustrated, individual step statuses 205 are shown as circles, and filled in circle corresponds to a step that has been completed. Other shapes may be used may be used without departing from the scope of this disclosure. Similarly, other visualizations may be used to indicate the status of a step such as greying out uncompleted steps, using checkboxes, using color to indicate completion, etc. Overall goal status 212 is represented as a partially filled-up rectangle with the filled-in portion corresponding to a value of the over call completed status in a goal data structure. However, as with the induvial step statues, other visualization methods may be implemented.

A user may view additional details about the steps by hovering over or clicking on an individual step status. Upon doing so an overlay interface 208 may be presented that indicates the names of each of the steps.

Figure 3:
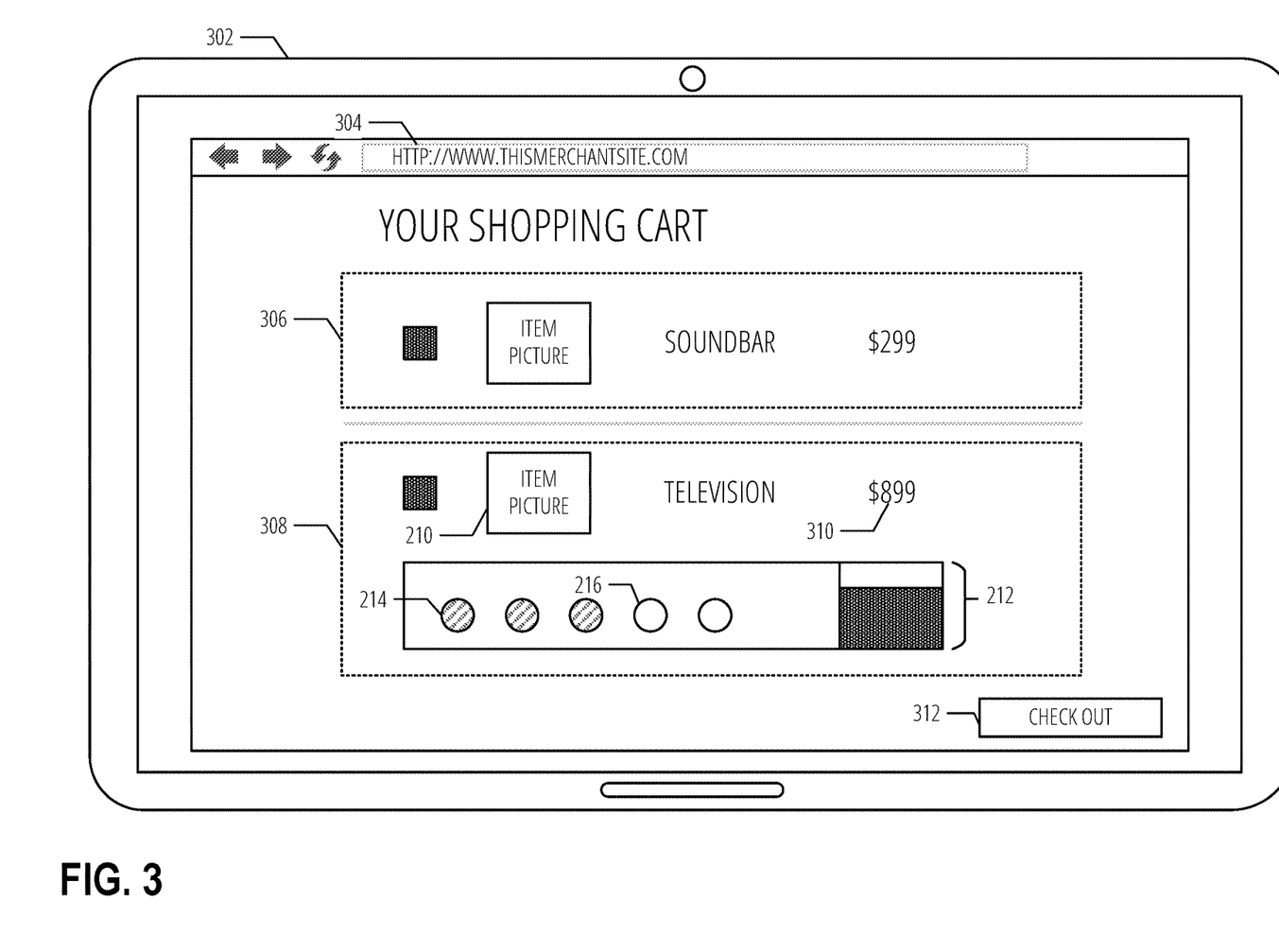
FIG. 3 is an illustration of a merchant website, according to various examples.

FIG. 3 is an illustration of a merchant website 304, according to various examples. The merchant website may be displayed on client device 302. The merchant website is depicted as a shopping cart that has two items added to it: item 306 and item 308. Item 308 is depicted as including embedded information that is served from application server 102 is various examples. The embedded information may be added as a result of a plugin running on web client or the merchant transmitting item identifiers of each of the items to application server 102.

If there is a match, application server 102 may transmit some or all of the information in an associated goal data structure for presentation on merchant website 304. In some examples, user interface compositor 132 may generate the web code for embedding and transmit the code to merchant website 304. As illustrated, item picture 210, step status indicator 214, step status indicator 216, and overall goal status 212 from FIG. 2 are included. More or fewer of the goal elements may be included without departing from the scope of the disclosure. For example, although price 310 is the same as the price in goal 204, the price is not served from application server 102.

Checkout button 312 may be used to purchase the items in the cart. If the overall status of item 308 is not "complete" than a message may be presented to the user asking if they still want to proceed or if they would like to complete more of the steps. If the user has enabled the option for an impulse purchase, an option (not illustrated) to use one of their available impulse purchases may be presented as well.

Figure 4:
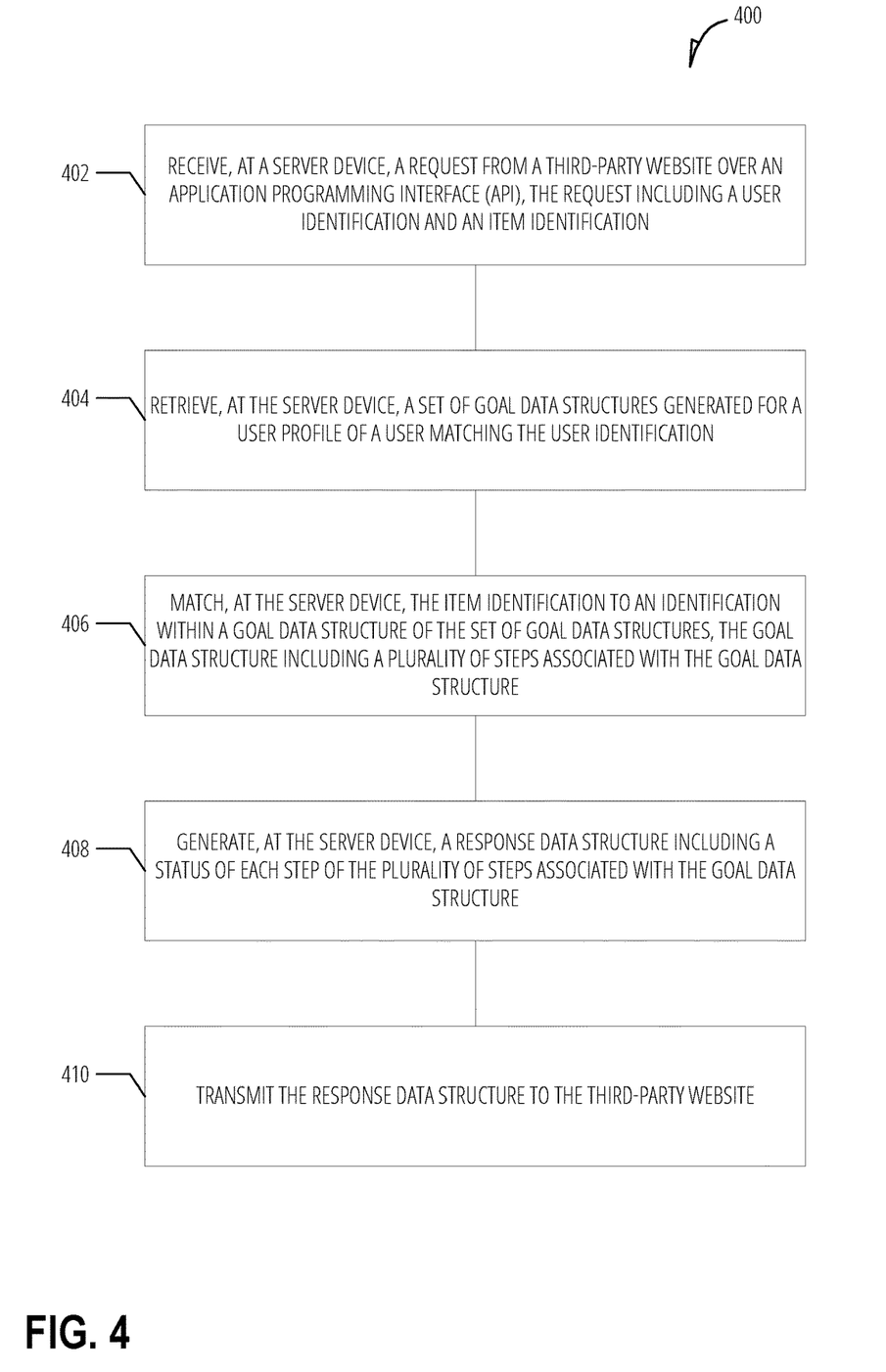
FIG. 4 is a flowchart illustrating a method for responding to a request from a website, according to various examples.

FIG. 4 is a flowchart illustrating a method for responding to a request from a website, according to various examples. The method is represented as a set of blocks that describe operation 402 to operation 410 of flowchart 400. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 4. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

In an example, the method includes operation 402 for receiving, at a server device (e.g., application server 102) a request from a third-party website (e.g., merchant server 130) over an application programming interface (e.g., API 116), the request including a user identification and an item identification. The user identification may be an alphanumeric identifier (e.g., a username) or an authorization token that is tied to a user identification in a user account on application server 102. The item identification may be a product number (e.g., a uniform product code) or a number assigned by application server 102.

In an example, the method includes operation 404 for retrieving, at the server device, a set of goal data structures (e.g., goal data structures 128) generated for a user profile (e.g., as stored in data store 118) of a user matching the user identification. For example, a query may be made to data store 118 for a user profile of user accounts 120 for a received username or a lookup table using a received token from the third-party website.

In an example, the method includes operation 406 for matching, at the server device, the item identification to an identification within a goal data structure of the set of goal data structures. In various examples, the goal data structure may include a plurality of steps associated with the goal data structure. The identification within the goal data structure may be a product number of the number assigned by application server 102.

In an example, the method includes operation 408 for generating, at the server device, a response data structure including a status of each step of the plurality of steps associated with the goal data structure. The response data structure by a java script object notation (JSON) response with elements such as the number of steps completed, number of step uncompleted, overall status, etc. In various examples, the response data structure may be a formatted data structure such as a hypertext markup language (HTML) snippet. In an example, the method includes operation 410 for transmitting the response data structure to the third-party website.

The method may also include where operation 408 includes generating a user interface. The user interface may include a number of unfilled graphical objects (e.g., circles) representing uncompleted steps of the plurality of steps associated with the goal data structure, and a number of filled graphical objects representing completed steps of the plurality of steps associated with the goal data structure.

The method may also include further includes receiving, at the server device, data indicating a change in status of a step in the plurality of steps, and updating the goal data structure based on the change in status.

The data indicating a changes in status may be based on location data from a mobile device where the mobile device identified as associated with the user in the user profile. For example, after a user visits an auto dealer, a step for a test drive may be marked as complete by goal logic 126. The method may also include where the data indicating a changes in status is based on a length of time. The method may also include where the data indicating a changes in status is based on receiving an affirmation from the user that the step has been completed.

The method may also include further includes selecting a plurality of users from a list of users stored in the user profile. The selecting may be based on user preferences or the most communicated with contacts (e.g., top five). For each respective user in the plurality of users a request message may be transmitted to a computing device of the respective user (e.g., via an application installed on the computing device or a text message that includes a link). The request message may include an approval option and a disapproval option-such as using buttons or links. The data indicating a changes in status is based on respective responses to the request message from each respective user. For example, if three out of five contacts indicate approval, the data may indicate to change the status of a step to complete.

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium.

In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
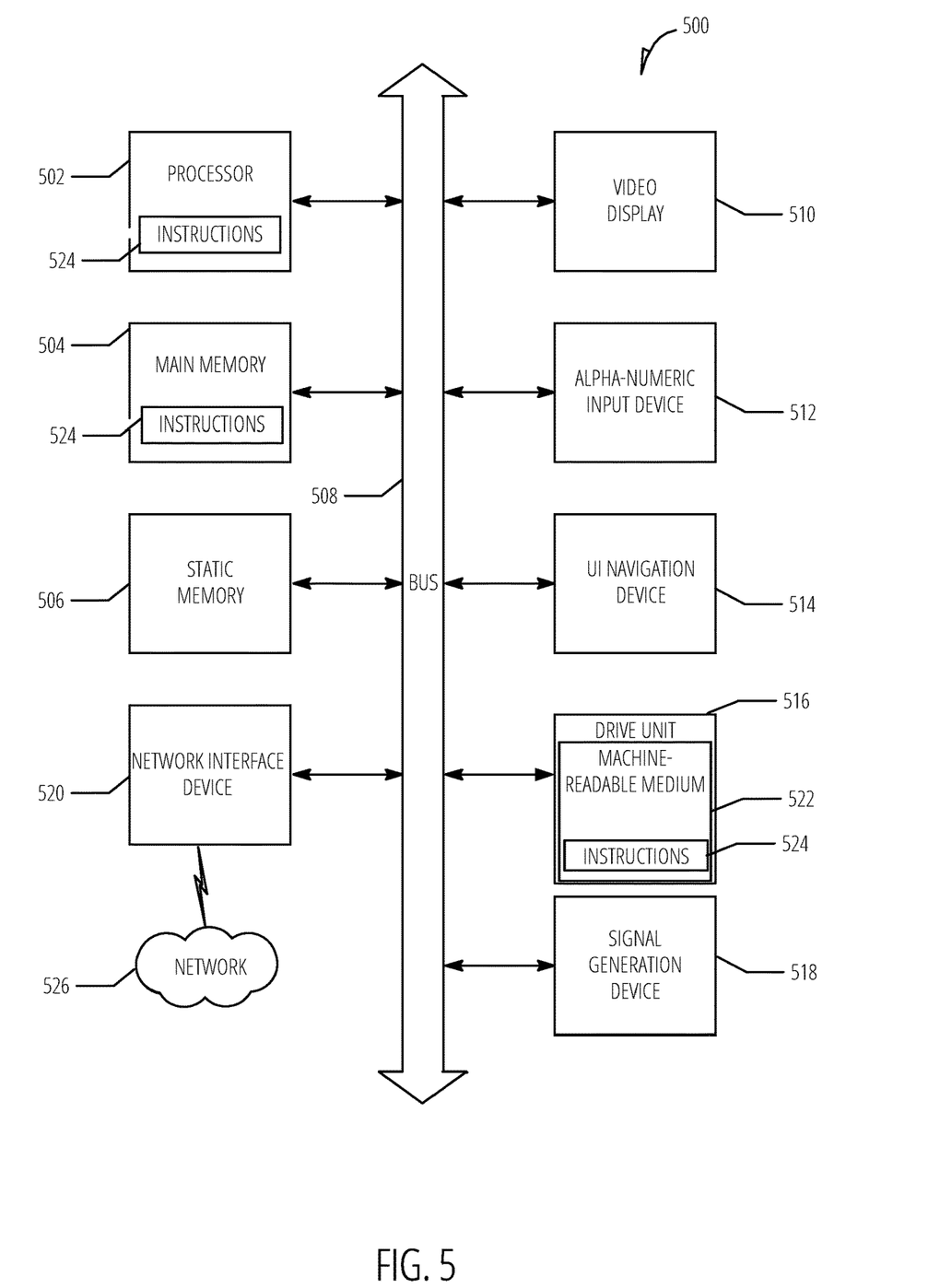
FIG. 5 is a block diagram illustrating an example machine upon which any one or more of the techniques (e.g., methodologies) discussed herein may be performed, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the at least one processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, 4G LTE/LTE-A or WiMAX networks, and 5G). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
   receiving, at a server device, a request from a third-party merchant website over an application programming interface (API), the request including a user identification and an item identification of an item for purchase on the third-party merchant website, the item identification associated with an item in a shopping cart on the third-party merchant website;
   retrieving, at the server device, a set of item purchase goal data structures generated for a user profile of a user matching the user identification;
   matching, at the server device, the item identification of the item for purchase to an item identification within an item purchase goal data structure of the set of item purchase goal data structures, the item purchase goal data structure including a plurality of steps associated with the item purchase goal data structure and a uniform resource locator of the third-party merchant website;
   determining a status of a research step of the plurality of steps by:
      inputting categorizations of a browser history associated with the user identification into a trained machine learning model;
      receiving an output from the trained machine learning model identifying a confidence level above a threshold value indicating the item was researched; and
      based on the confidence level being above the threshold, updating the status of the research step as completed;
   generating, at the server device, a response data structure including a shopping cart embedded user interface with a graphical representation of a status of each step of the plurality of steps associated with the item purchase goal data structure; and
   transmitting the response data structure to the third-party merchant website.

2. The method of claim 1, wherein generating, at the server device, the response data structure includes generating the shopping cart embedded user interface, the shopping cart embedded user interface including:
   a number of unfilled graphical objects representing uncompleted steps of the plurality of steps associated with the item purchase goal data structure; and
   a number of filled graphical objects representing completed steps of the plurality of steps associated with the item purchase goal data structure.

3. The method of claim 1, further comprising:
   receiving, at the server device, data indicating a change in status of a step in the plurality of steps; and
   updating the item purchase goal data structure based on the change in status.

4. The method of claim 3, wherein the data indicating the change in status is based on location data from a mobile device, the mobile device identified as associated with the user in the user profile.

5. The method of claim 3, wherein the data indicating the change in status is based on a length of time.

6. The method of claim 3, wherein the data indicating the change in status is based on receiving an affirmation from the user that the step has been completed.

7. The method of claim 3, further comprising:
   selecting a plurality of users from a list of users stored in the user profile;
   for each respective user in the plurality of users, transmitting a request message to a computing device of the respective user, the request message including an approval option and a disapproval option; and
   wherein the data indicating the change in status is based on respective responses to the request message from each respective user.

8. A non-transitory computer-readable medium comprising instructions, which when executed by at least one processor, configure the at least one processor to perform operations comprising:
   receiving, at a server device, a request from a third-party merchant website over an application programming interface (API), the request including a user identification and an item identification of an item for purchase on the third-party merchant website, the item identification associated with an item in a shopping cart on the third-party merchant website;
   retrieving, at the server device, a set of item purchase goal data structures generated for a user profile of a user matching the user identification;
   matching, at the server device, the item identification of the item for purchase to an item identification within an item goal data structure of the set of item purchase goal data structures, the item purchase goal data structure including a plurality of steps associated with the item purchase goal data structure and a uniform resource locator of the third-party merchant website;
   determining a status of a research step of the plurality of steps by:
      inputting categorizations of a browser history associated with the user identification into a trained machine learning model;
      receiving an output from the trained machine learning model identifying a confidence level above a threshold value indicating the item was researched; and
      based on the confidence level being above the threshold, updating the status of the research step as completed;
   generating, at the server device, a response data structure including a shopping cart embedded user interface with a graphical representation of a status of each step of the plurality of steps associated with the item purchase goal data structure; and
   transmitting the response data structure to the third-party merchant website.

9. The non-transitory computer-readable medium of claim 8, wherein the operation of generating, at the server device, the response data structure includes generating the shopping cart embedded user interface, the shopping cart embedded user interface including:
   a number of unfilled graphical objects representing uncompleted steps of the plurality of steps associated with the item purchase goal data structure; and a number of filled graphical objects representing completed steps of the plurality of steps associated with the item purchase goal data structure.

10. The non-transitory computer-readable medium of claim 8, further comprising instructions, which when executed by the at least one processor, configure the at least one processor to perform operations comprising:
   receiving, at the server device, data indicating a change in status of a step in the plurality of steps; and
   updating the item purchase goal data structure based on the change in status.

11. The non-transitory computer-readable medium of claim 10, wherein the data indicating the change in status is based on location data from a mobile device, the mobile device identified as associated with the user in the user profile.

12. The non-transitory computer-readable medium of claim 10, wherein the data indicating the change in status is based on a length of time.

13. The non-transitory computer-readable medium of claim 10, wherein the data indicating the change in status is based on receiving an affirmation from the user that the step has been completed.

14. The non-transitory computer-readable medium of claim 10, further comprising instructions, which when executed by the at least one processor, configure the at least one processor to perform operations comprising:
   selecting a plurality of users from a list of users stored in the user profile;
   for each respective user in the plurality of users, transmitting a request message to a computing device of the respective user, the request message including an approval option and a disapproval option; and
   wherein the data indicating the change in status is based on respective responses to the request message from each respective user.

15. A system comprising:
   at least one processor; and
   a storage device comprising instructions, which when executed by the at least one processor, configure the at least one processor to perform operations comprising:
   receiving, at a server device, a request from a third-party merchant website over an application programming interface (API), the request including a user identification and an item identification of an item for purchase on the third-party merchant website, the item identification associated with an item in a shopping cart on the third-party merchant website;
   retrieving, at the server device, a set of item purchase goal data structures generated for a user profile of a user matching the user identification;
   matching, at the server device, the item identification of the item for purchase to an identification within an item purchase goal data structure of the set of goal data structures, the item purchase goal data structure including a plurality of steps associated with the item purchase goal data structure and a uniform resource locator of the third-party merchant website;
   determining a status of a research step of the plurality of steps by:
      inputting categorizations of a browser history associated with the user identification into a trained machine learning model;
      receiving an output from the trained machine learning model identifying a confidence level above a threshold value indicating the item was researched; and
      based on the confidence level being above the threshold, updating the status of the research step as completed;
   generating, at the server device, a response data structure including a shopping cart embedded user interface with a graphical representation of a status of each step of the plurality of steps associated with the goal data structure; and
   transmitting the response data structure to the third-party merchant website.

16. The system of claim 15, wherein the operation of generating, at the server device, the response data structure includes generating the shopping cart embedded user interface, the shopping cart embedded user interface including:
   a number of unfilled graphical objects representing uncompleted steps of the plurality of steps associated with the item purchase goal data structure; and
   a number of filled graphical objects representing completed steps of the plurality of steps associated with the item purchase goal data structure.

17. The system of claim 15, the storage device further comprising instructions, which when executed by the at least one processor, configure the at least one processor to perform operations comprising:
   receiving, at the server device, data indicating a change in status of a step in the plurality of steps; and
   updating the item purchase goal data structure based on the change in status.

18. The system of claim 17, wherein the data indicating the change in status is based on location data from a mobile device, the mobile device identified as associated with the user in the user profile.

19. The system of claim 17, wherein the data indicating the change in status is based on a length of time.

20. The system of claim 17, wherein the data indicating the change in status is based on receiving an affirmation from the user that the step has been completed.

* * * * *